US011996667B2

(12) United States Patent
Stoll et al.

(10) Patent No.: US 11,996,667 B2
(45) Date of Patent: May 28, 2024

(54) DEMATING SYSTEM FOR SEPARATING AN ELECTRICAL CONNECTOR ASSEMBLY

(71) Applicant: Honeywell Federal Manufacturing & Technologies, LLC, Kansas City, MO (US)

(72) Inventors: Trevor T. Stoll, Excelsior Springs, MO (US); Michael E. Auxier, Olathe, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 51 days.

(21) Appl. No.: 17/678,637

(22) Filed: Feb. 23, 2022

(65) Prior Publication Data

US 2023/0268704 A1 Aug. 24, 2023

(51) Int. Cl.
*H01R 43/26* (2006.01)
*H01R 13/633* (2006.01)

(52) U.S. Cl.
CPC ........... *H01R 43/26* (2013.01); *H01R 13/633* (2013.01)

(58) Field of Classification Search
CPC .... H01R 43/26; H01R 13/633; H01R 13/635; H05K 13/0491; Y10T 29/53274; Y10T 29/53283
See application file for complete search history.

(56) References Cited

U.S. PATENT DOCUMENTS

| | | | | |
|---|---|---|---|---|
| 3,117,370 | A | 1/1964 | Kauppi et al. | |
| 3,699,629 | A * | 10/1972 | Hood, Jr. | H05K 13/0491 29/278 |
| 4,468,858 | A | 9/1984 | Gulberg et al. | |
| 4,521,959 | A * | 6/1985 | Sprenkle | H05K 13/0491 29/758 |
| 4,817,274 | A * | 4/1989 | Higgins | H01R 13/635 29/764 |
| 5,329,693 | A * | 7/1994 | Smith | H01R 43/26 29/764 |
| 5,473,816 | A | 12/1995 | Harden, Jr. et al. | |
| 6,249,960 | B1 | 6/2001 | Faesel | |
| 10,195,726 | B2 | 2/2019 | Truong et al. | |
| 2017/0149193 | A1 | 5/2017 | Alam et al. | |

OTHER PUBLICATIONS

Yutko, Brian et al.; Inline Electrical Connector Mate/Demate Pliers; Tech Briefs: Engineering Solutions for Design & Manufacturing; Aug. 1, 2010; pp. 1-5; Kennedy Space Center; retrieved from https://www.techbriefs.com/component/content/article/tb/techbriefs/mechanics-and-machinery/8279 on May 5, 2022.

* cited by examiner

*Primary Examiner* — Donghai D Nguyen
(74) *Attorney, Agent, or Firm* — Erise IP, P.A.

(57) ABSTRACT

A demating device configured to demate an electrical connector assembly having a first connector and a second connector is provided. The demating device may include a first separating member, a second separating member, and a gripping assembly. Actuation of the first separating member and the second separating member towards one another drives the jaws of the gripping assembly together, therein allowing secure gripping of the electrical connector assembly via the demating device for separation of the first and second connectors.

9 Claims, 7 Drawing Sheets

DEMATING SYSTEM FOR SEPARATING AN ELECTRICAL CONNECTOR ASSEMBLY

STATEMENT OF GOVERNMENTAL SUPPORT

This invention was made with governmental support under DE-NA0002839 awarded by the United States Department of Energy/National Nuclear Security Administration. The government has certain rights in the invention.

BACKGROUND

1. Field

Embodiments of the invention relate generally to demating connections. More specifically, embodiments of the present invention are directed to a device and system for demating electrical connector assemblies.

2. Related Art

Multi-pin connectors (MPCs) are widely used throughout the electronics industry to connect a relatively large number of electrical conductors. An MPC is generally formed of two connector portions. One portion of the MPC is a male portion having a plurality of projecting electrical pins aligned in a predetermined pattern, such as rows or concentric circles. The pins individually connect through a body of the connector portion to lead wires. The other portion of the MPC is a female portion having a plurality of sockets or receptacles located in corresponding positions to receive the pins of the male portion. The sockets also individually connect to lead wires through the body of the female connector portion. When the two MPC portions are connected and the pins of the male portion are inserted into the corresponding sockets of the female portion, an electrical connection through the pins and sockets establishes continuous electrical conductivity between the lead wires attached to the MPC portions.

One of the common uses of MPCs is for the connection of circuit boards to other electronic equipment. In this situation, components on the circuit board are connected to the lead wires of one portion of the MPC. The lead wires of the other portion of the MPC are connected to other electronic equipment. Electrical power is supplied to the circuit board and signals are conducted to or from the circuit board through the lead wires and the connected MPC portions. If a component on the circuit board fails or the entire circuit board fails, it is convenient to disconnect the MPC portions and replace the circuit board and MPC portion attached to the faulty circuit board, rather than disconnect each lead wire from the faulty circuit board and then reconnect each lead wire to a new circuit board. The use of MPCs in this way results in efficient and convenient replacement of the failed electrical equipment. Traditionally, MPC portions have been separated and connected by hand. In separating or connecting the MPC, the user may grasp both portions of the MPC with his or her fingers and forcibly separate or connect the two MPC portions. However, small MPC connector portions with a large number of small pins and small sockets are difficult to align when connecting and separating them by hand.

Failure to maintain proper alignment of the MPC portions when separating them can damage the pins, sockets, or lead wires. Pins on the MPC can be bent or broken if the user mis-aligns, twists, or bends each MPC portion relative to the other when separating them. Misalignment occurs when any of the pins are offset in any direction from their intended sockets. If misalignment occurs, the pin or pins that are not matched with sockets bend over or break.

Twisting results from the user bending each portion of the MPC relative to the other portion during the separation of the portions. Twisting occurs relatively easily, and can break or bend the pins, thereby damaging the male MPC portion and rendering it useless. Lead wire breakage can also occur during separation. Often, the user grasps the lead wires because the bodies of the MPC portions are small or difficult to manipulate. Fatigue stress from repeated tension and compression forces on the lead wires caused by manually gripping the lead wires while connecting and disconnecting the MPC frequently results in broken lead wires. Lead wire failure may be difficult to detect because the insulation covering the lead wires obscures the break in the internal conductor.

Prior devices do not provide an adequate mechanism for both stably gripping and evenly separating connectors. U.S. Pat. No. 6,249,960 to Faesel discloses a device that grips one end of an electrical connection for demating to allow a user to pull the electrical connection apart. U.S. Pat. No. 4,468,858 to Gulberg et al. discloses a plunger assembly configured to decouple a connection. U.S. Patent Application Publication No. 2017/0149193 to Alam et al. and U.S. Pat. No. 4,817,274 to Higgins disclose additional decoupler devices. U.S. Pat. No. 5,473,816 to Harden Jr. et al. and U.S. Pat. No. 3,117,370 to Kauppi et al. both disclose a demating device in which the gripping mechanism is fixed at one size.

Thus, there is a need for a configurable reliable tool that will evenly grip and demate MPCs, or other electrical connections with delicate connections, without twisting or damaging the MPCs.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to a demating tool configured to separate a first connector and a second connector of an electrical connector assembly, the demating tool including: a first separating member and a second separating member, each configured to be operatively connected to a handle assembly; wherein the first separating member and the second separating member are configured to open and close in a first direction when actuated by the handle assembly, wherein the first separating member and the second separating member are configured to move substantially parallel to each other; and a first claw and a second claw operatively connected together and attached to the first separating member, wherein the first claw and the second claw are configured to open and close in a second direction substantially perpendicular to the first direction, wherein the first claw and the second claw are configured to move towards each other when the first separating member and the second separating member move in the first direction.

In some aspects, the techniques described herein relate to a demating system configured to separate a first connector and a second connector of an electrical connector assembly, the demating system including: a first separating member and a second separating member configured to operatively attach to a handle assembly, wherein the first separating member and the second separating member are configured to move laterally in a first direction upon actuation of the handle assembly, wherein the first direction is substantially parallel to a longitudinal axis of the electrical connector assembly; a set of claws operatively connected to a distal end of the first separating member at a plurality of pivot joints, the set of claws configured to move radially in a second direction; an elastic member operatively connected to the proximal ends of the set of claws, wherein the elastic member biases the proximal ends of the set of claws towards one another around the plurality of pivot joints; and a ramp portion disposed at a distal portion of the second separating member configured to engage the proximal ends of the set of claws to move the set of claws towards a closed position.

In some aspects, the techniques described herein relate to a method for demating a first electrical connector assembly having a first connector and a second connector, the method including the steps of: providing a demating tool including a first separating member, a second separating member, and a first gripping assembly including a set of claws; receiving the first connector within a first connector receiving portion of the first separating member and receiving the second connector within the second connector receiving portion of the second separating member; actuating the first separating member and the second separating member to close in a first direction, wherein the first direction is substantially parallel to a longitudinal axis of the first electrical connector assembly; actuating the set of claws to close in a second direction, wherein the second direction is substantially perpendicular to the longitudinal axis of the first electrical connector assembly; gripping the first connector of the first electrical connector assembly via the set of claws; and demating the first connector and the second connector.

BRIEF DESCRIPTION OF THE DRAWING FIGURES

Embodiments of the invention are described in detail below with reference to the attached drawing figures, wherein.

Figure 1:
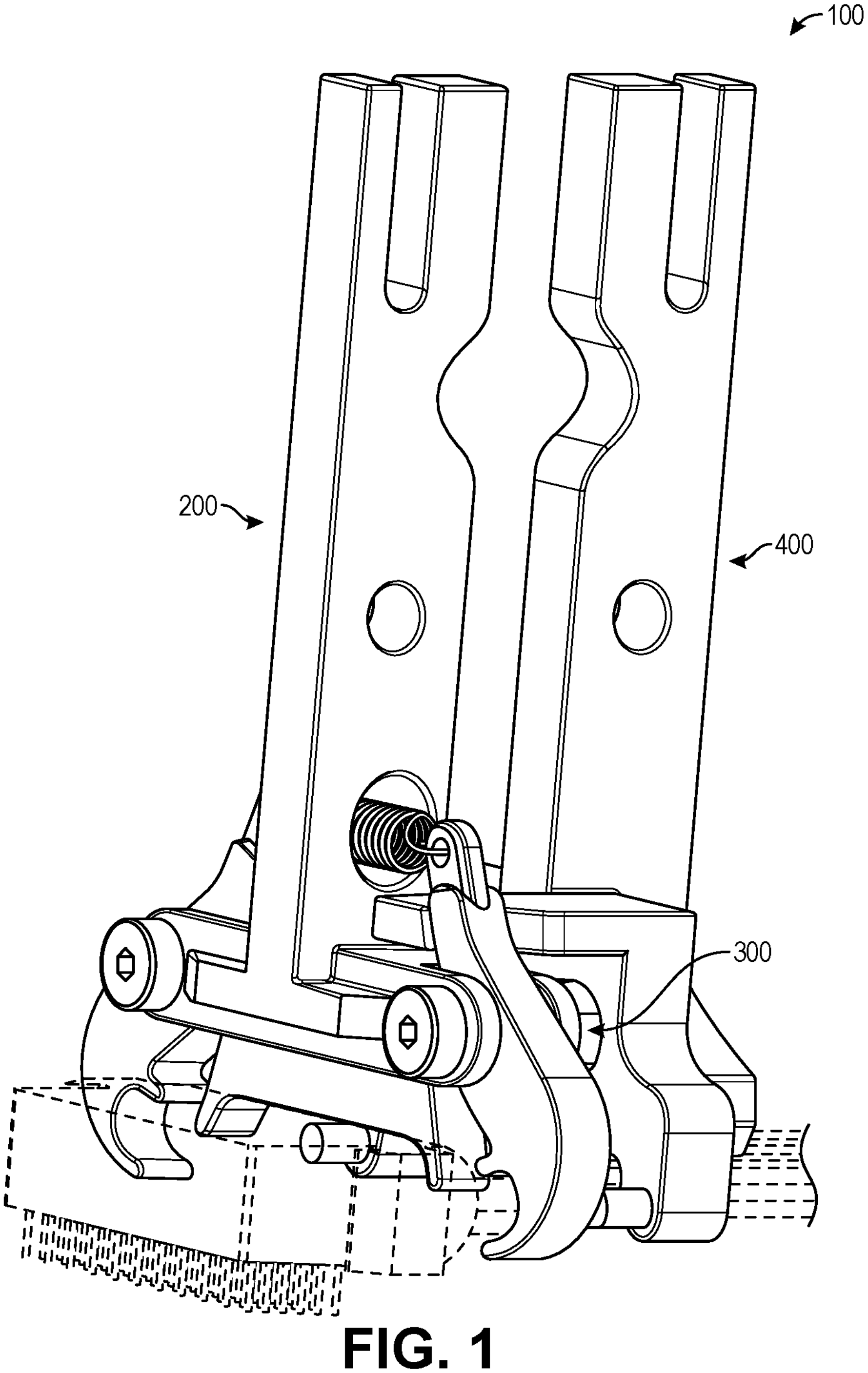
FIG. 1 is a depiction a demating device, in some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Demating as used herein is the process of separating or disconnecting an electrical connector, the operation of which results in disconnection of the plug and socket and the pins and corresponding receptacles therein. Damage to one or more of the pins or receptacles can result, in part, from uneven or improper demating, wherein a side load is caused to be introduced in the connector, and particularly within the pins and/or receptacles, due to misalignment of the connector portions. Proper, parallel demating can provide advantages, such as minimal or zero side loading of the pins and receptacles during a demating event.

FIG. 1 depicts a demating device 100, in some embodiments, configured to demate electrical connector assemblies. The demating device 100 may include a first separating member 200, a gripping assembly 300, and a second separating member 400. As will be described in greater detail below, actuation of first separating member 200 towards second separating member 400 will drive a lower portion of gripping assembly 300 together. This motion allows demating device 100 to grip an electrical connector stably and evenly via gripping assembly 300. Such a grip prevents twisting or unalignment of the electrical connector during the demating process, therefore preventing damage of any pins or receptacles. In some embodiments, this motion further allows demating device 100 to safely demate an electrical connector assembly in the parallel direction. Thus, demating device allows for the ability to both grip and demate the connectors using only one device.

In some embodiments, demating device 100 may be configured to demate different sized electrical connector assemblies. For example, in some embodiments, demating device 100 may be configured to demate a 7-pin connector. In some embodiments, demating device 100 may be configured to demate a 51-pin connector. In some embodiments, demating device 100 may be configured to demate any electrical connector comprising about 7 pins to about 51 pins. Aspects of the sizing of demating device 100 may be adjusted for demating different sized electrical connectors as stated above.

In some embodiments, elements of demating device 100 may comprise a rigid material. In some embodiments, elements of demating device 100 may comprise a metal material. In some embodiments, elements of demating device 100 may comprise a hard plastic material. In some embodiments, elements of demating device 100 may comprise polyetheretherketone. In some embodiments, elements of demating device 100 may comprise a rubber material. In some embodiments, elements of demating device 100 may be formed using an additive printing process.

Figure 2:
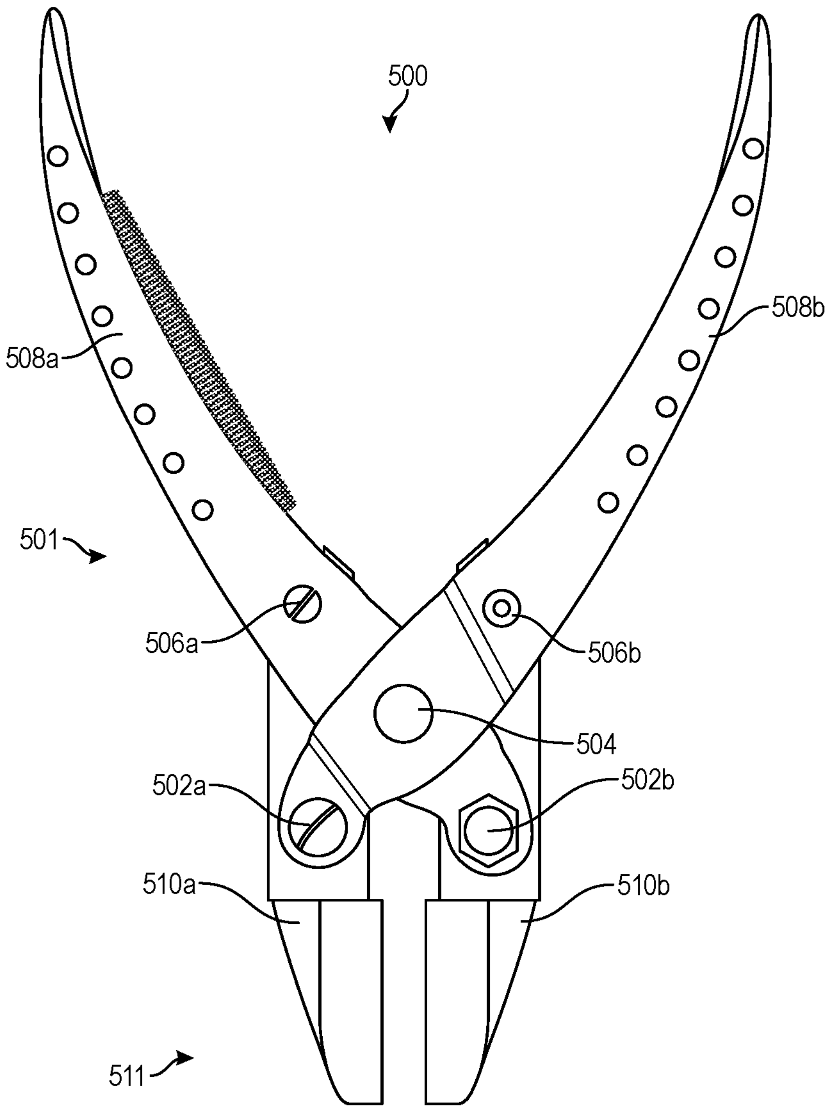
FIG. 2 is a depiction of a set of pliers, which in some embodiments may operatively connect to the demating device.

FIG. 2 is a depiction of a set of pliers 500, which in some embodiments may operatively connect to demating device 100. Pliers 500, in some embodiments, include a handle assembly 501 and a distal assembly 511. Handle assembly 501 comprises bolts 502*a*, 502*b*, connection member 504, rods 506*a*, 506*b*, and handles 508*a*, 508*b*. Distal assembly 511 comprises pinching members 510*a*, 510*b*. In some embodiments, distal assembly 511 may be removed from pliers 500 and replaced with portions of demating device 100. This will be discussed in greater detail below.

Figure 3:
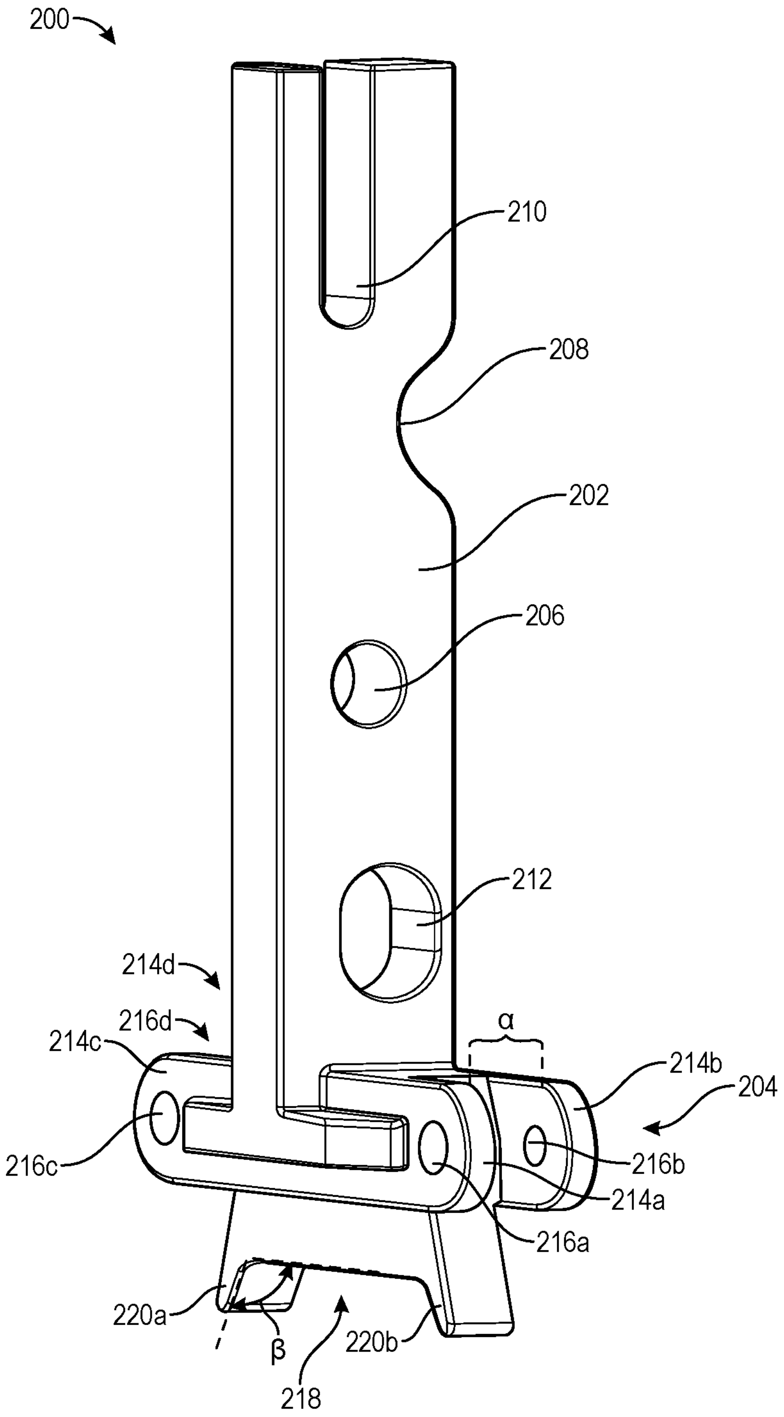
FIG. 3 is a depiction of a first separating member of the demating device, in some embodiments.

FIG. 3 is a depiction of the first separating member 200, in some embodiments. First separating member 200 may include a proximal arm 202 and a distal portion 204. In some embodiments, proximal arm 202 may include first bore 206, first recess 208, and second recess 210. In these embodiments, one or more of the first bore 206, the first recess 208, and the second recess 210 may be configured to receive portions of handle assembly 501 of pliers 500. For example, in some embodiments first bore 206 may be configured to receive one of bolts 502*a* or 502*b*. In some embodiments, one of bolts 502*a* or 502*b* may mechanically fasten to first bore 206, and therefore fasten first separating member 200 to one end of the handle assembly 501 of pliers 500. In some embodiments, first recess 208 may be configured to allow connection member 504 to reside therein during operation. For example, as will be discussed further below, when first separating member 200 and second separating member 400 are brought towards one another along a substantially parallel axis, first recess 208 may provide a hollowed out region for connection member 504 to reside. In some embodiments, second recess 210 may be configured to receive one of rods 506*a* or 506*b* of pliers 500. For example, a user may attach proximal arm 202 to handle assembly 501 of pliers 500. During insertion, second recess 210 may receive one of rods 506*a* or 506*b*. In this manner, pliers 500 may operatively connect to first separating member 200.

Distal portion 204, in some embodiments, includes a hole 212. Hole 212, in some embodiments, is configured to receive an elastic member 310 of gripping assembly 300 therethrough. Distal portion 204, in some embodiments, further comprises connecting extensions 214*a*, 214*b*, 214*c*, and 214*d*. Connecting extensions 214*a*, 214*b*, 214*c*, 214*d* extend longitudinally from first separating member 200. In some embodiments, each connecting extension 214*a*, 214*b*, 214*c*, 214*d* includes a connecting hole 216*a*, 216*b*, 216*c*, and 216*d*. For purposes of clarity, a first side of distal portion 204 will be discussed below. The second side of distal portion 204 is substantially similar to the first side of distal portion 204. In some embodiments, connecting extensions 214*a* and 214*b* may be separated by a distance alpha to allow for reception of either first claw 302 or second claw 304 therein. In some embodiments, connecting extensions 214*c* and 214*d* may be similarly separated by the same distance alpha to allow for reception of either first claw 302 or second claw 304 therein. In some embodiments, the distance alpha may be between about 0.05 inches to about 0.4 inches. In some embodiments, the distance alpha may be between about 0.1 inches to about 0.3 inches. In some embodiments, the distance alpha may be about 0.195 inches.

In some embodiments, connecting holes 216*a* and 216*b* located on connecting extensions 214*a* and 214*b* may be configured to receive a fastener 322*a* or 322*b* therein. In these embodiments, fastener 322*a* or 322*b* may connect first separating member 200 to gripping assembly 300. More specifically, fastener 322*a* or 322*b* may operatively connect first claw 302 or second claw 304 to connecting extensions 214*a* and 214*b*, therein providing a pivot point for first claw 302 or second claw 304 when actuated, as will be discussed further below. Fastener 322*a*, 322*b* may be a bolt, screw, or any other mechanical connection.

In some embodiments, distal portion 204 further comprises a connector receiving portion 218. Connector receiving portion 218 may include two flanges 220*a* and 220*b* having a recessed portion disposed therebetween. In some embodiments, connector receiving portion 218 may be configured to receive the socket portion of an electrical connector when demating the connector. In some embodiments, connector receiving portion 218 may be configured to receive the plug portion of an electrical connector when demating the connector. In some embodiments, connector receiving portion 218 may be configured to receive a portion of first connector 602 (see FIG. 7A). The size and shape of connector receiving portion 218 may be configured to receive different sized connector assemblies, such as those between 7 pins and 51 pins. In some embodiments, the distance between flanges 220*a* and 220*b* may be between about 0.2 inches to about 2.0 inches. In some embodiments, the distance between flanges 220*a* and 220*b* may be between about 0.6 inches to about 1.6 inches. In some embodiments, the distance between flanges 220*a* and 220*b* may be between about 0.7 inches to about 0.9 inches. In some embodiments, flanges 220*a* and 220*b* may extend at an angle beta of between about 90 degrees to about 170 degrees. In some embodiments, flanges 220*a* and 220*b* may extend at an angle beta of between about 100 degrees to about 150 degrees. In some embodiments, flanges 220*a* and 220*b* may extend at an angle beta of between about 110 degrees to about 130 degrees.

Figure 4A:
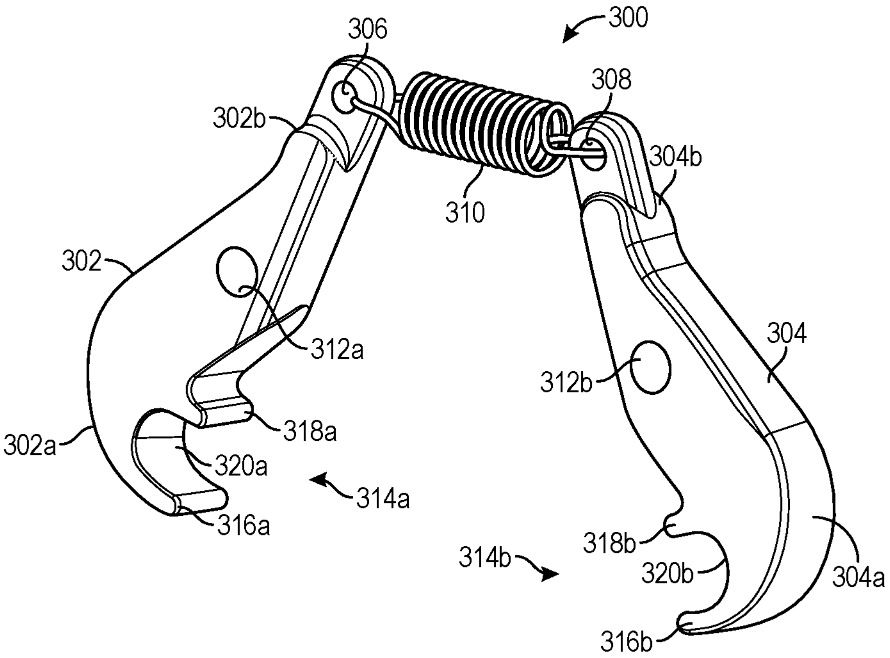
FIG. 4A is a depiction of a gripping assembly of the demating device, in some embodiments.

Turning now to FIG. 4A, the gripping assembly 300 is depicted in some embodiments. Gripping assembly 300 may include first claw 302 and second claw 304. In some embodiments, first claw 302 and second claw 304 may be between about 0.05 inches wide to about 0.5 inches wide. In some embodiments, first claw 302 and second claw 304 may be between about 0.1 inches wide to about 0.3 inches wide. In embodiments, first claw 302 includes a distal end 302*a* and a proximal end 302*b*. In embodiments, second claw 304 includes a distal end 304*a* and a proximal end 302*b*. Proximal ends 302*b* and 304*b* may comprise elastic member receiving holes 306 and 308, configured to receive a portion of elastic member 310. In some embodiments, elastic member 310 may bias proximal ends 302*b* and 304*b* towards each other, which will be discussed in greater detail below. In some embodiments, elastic member 310 may comprise a spring, having a modulus of about one pound to about five pounds. In some embodiments, elastic member 310 may comprise a rubber material or other stretchable material. In some embodiments, elastic member 310 is between about 0.2 inches to about 2 inches when compressed. In some embodiments, elastic member 310 is between about 0.4 inches to about 1 inch when compressed.

In some embodiments, first claw 302 and second claw 304 may include rotational holes 312*a* and 312*b*. As will be discussed below, rotational holes 312*a* and 312*b* may provide a pivot point for first claw 302 and second claw 304 to rotate around, respectively. First claw 302 and second claw 304 may include grips 314*a* and 314*b* disposed at the distal ends 302*a* and 304*a*. In some embodiments, grips 314*a* and 314*b* may include distal flanges 316*a* and 316*b*. In some embodiments, when in the open configuration (see FIG. 7A), the distance between distal flange 316*a* and distal flange 316*b* is between about 0.5 inches to about 3 inches. In some embodiments, when in the open configuration, the distance between distal flange 316*a* and distal flange 316*b* is between about 1 inch to about 2 inches. In some embodiments, grips 314*a* and 314*b* may also include proximal flanges 318*a* and 318*b*.

Distal flanges 316*a*, 316*b*, and proximal flanges 318*a*, 318*b*, may include rounded recesses 320*a*, 320*b* disposed therebetween. Rounded recesses 320*a*, 320*b*, may, in some embodiments, comprise a substantially rounded shape. Rounded recesses 320*a*, 320*b*, may, in some embodiments, comprise an octagonal shape. In some embodiments, rounded recesses 320*a*, 320*b*, may comprise a hexagonal shape. In some embodiments, rounded recesses 320*a*, 320*b*, may comprise a tetrahedral shape. Distal flanges 316*a*, 316*b*, proximal flanges 318*a*, 318*b*, and rounded recesses 320*a*, 320*b*, may, in some embodiments, be configured to receive portions of an electrical connector. In some embodiments, grips 314*a*, 314*b* may be configured to received standoffs of an electrical connection, such as standoffs 606 of first connector 602 (see FIG. 7A-7B). In some embodiments, the internal surface of the grips 314*a* and 314*b* may comprise a material with a high friction coefficient, such as rubber, so as to aid in gripping an electrical connector assembly therein.

In some embodiments, the sizing of the gripping assembly 300 may be adjusted according to the size of the electrical connector assembly being demated. For example, the length and tension of elastic member 310 may be adjusted, for instance, increased in length, to accommodate a larger electrical connector assembly. In some embodiments, the size of the grips 314*a* and 314*b* may be adjusted to accommodate the size of the electrical connector assembly. For example, the distance between distal flanges 316*a*, 316*b*, and proximal flanges 318*a*, 318*b*, may be increased to accommodate a larger electrical connector assembly, more specifically larger standoffs. Similarly, in some embodiments, the depth and shape of rounded recesses 320*a*, 320*b*, may be adjusted to receive different sized electrical connector assemblies. In some embodiments, the width of first claw 302 and second claw 304 may be adjusted to accommodate different sized electrical connector assemblies. For example, the width of first claw 302 and second claw 304 may be decreased to accommodate a smaller electrical connector assembly.

In some embodiments, gripping assembly 300 may be interchangeable with first separating member 200 so as to accommodate different electrical connector assemblies. For example, there may be 1, 2, 3, 4, 5, 6, 7, 8 or more different sized gripping assemblies 300 that may be exchanged with one another, but all fit into the same first separating member 200. In this way, a user may easily adjust the demating device 100 to fit the size of the electrical connector assembly being demated.

Figure 4B:
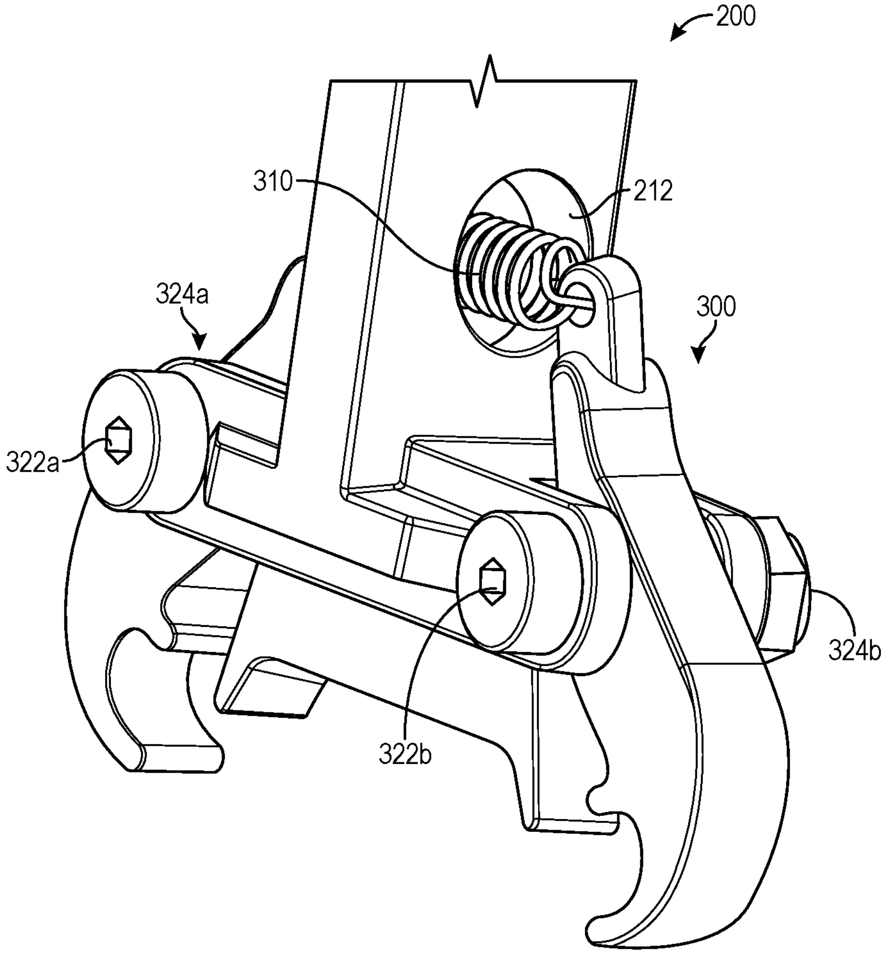
FIG. 4B is a depiction of the first separating member operatively connected to gripping assembly, in some embodiments.

FIG. 4B depicts the first separating member 200 operatively connected to gripping assembly 300, in some embodiments. As illustrated, elastic member 310 may be received through hole 212 in the distal portion 204 of first separating member 200. In some embodiments, gripping assembly 300 may be operatively connected to first separating member 200 via fasteners 322*a*, 322*b*, and nuts 324*a*, 324*b*. Fasteners 322*a*, 322*b*, may be received through connecting holes 216*a*, 216*c*, received through rotational holes 321*a*, 312*b*, and received through connecting holes 216*b*, 216*d*. Fasteners 322*a*, 322*b*, may then be anchored by nuts 324*a*, 324*b*, therein securing gripping assembly 300 to first separating member 200. In some embodiments, fasteners 322*a*, 322*b*, and nuts 324*a*, 324*b*, may comprise bolts or shoulder bolts. While not explicitly stated, it is contemplated that any fastening means which would allow rotation of first claw 302 and second claw 304 around rotational holes 312*a* and 312*b* while maintaining connection of gripping assembly 300 to first separating member 200, such as those known to a person skilled in the art, may be used.

Figure 5:
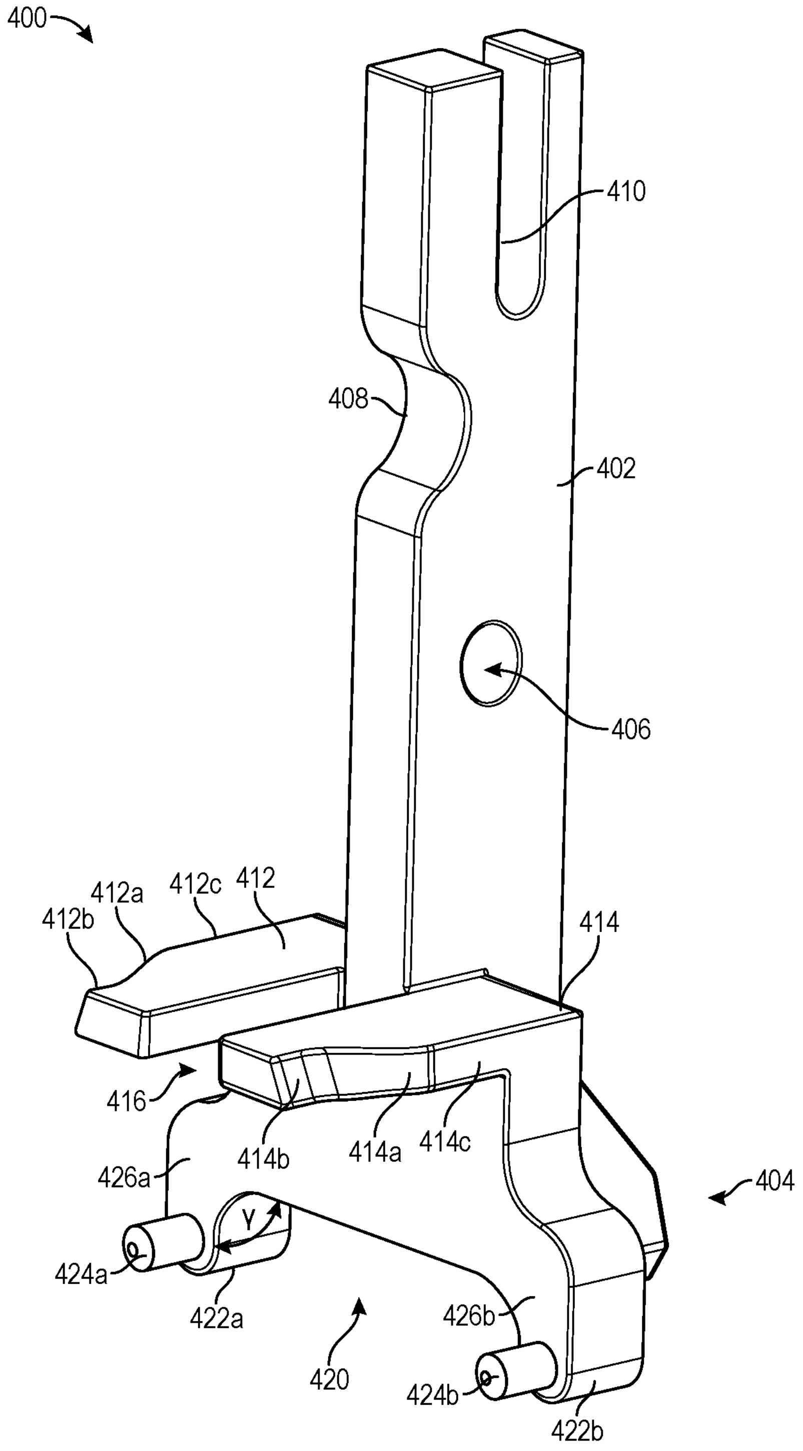
FIG. 5 is a depiction of the second separating member of the demating device, in some embodiments.

FIG. 5 depicts the second separating member 400, in some embodiments. Second separating member 400 may include a proximal arm 402 and a distal portion 404. Proximal arm 402 may include first bore 406, first recess 408, and second recess 410. In some embodiments, first bore 406, first recess 408, and second recess 410 may be configured to receive portions of pliers 500. For example, in some embodiments first bore 406 may be configured to receive either bolt 502*a* or 502*b* at the functional end of pliers 500. In some embodiments, either bolt 502*a* or 502*b* may mechanically fasten to first bore 406, and therefore fasten second separating member 400 to one end of the pliers 500. In some embodiments, first recess 408 may be configured to allow connection member 504 to reside therein during operation. For example, when second separating member 400 and first separating member 200 are brought towards one another in a substantially parallel direction, first recess 408 may provide a hollowed out region for connection member 504 to reside. In some embodiments, second recess 410 may be configured to receive either rod 506*a* or 506*b* of pliers 500. For example, a user may attach proximal arm 402 to handle assembly 501 of the pliers 500. During insertion, second recess 410 may receive either rod 506*a* or 506*b*. In this manner, pliers 500 may operatively connect to second separating member 400.

It is noted that in some embodiments, both first separating member 200 and second separating member 400 may be connected to pliers 500. As such, actuation of pliers 500 via handles 508*a* and 508*b* may bias first separating member 200 and second separating member 400 towards each other in a substantially parallel direction. This movement, may, in some embodiments, allow for gripping assembly 300 to grasp an electrical connector assembly. Furthermore, in some embodiments, this movement may cause demating of a connection by actuating a second connector of the connection away from a first connector in a substantially parallel direction. This will be discussed in greater detail below with reference to FIGS. 7A-7B.

In some embodiments, distal portion 404 may include a first ramp flange 412 and second ramp flange 414. First ramp flange 412 and second ramp flange 414 may comprise a gap 416 disposed therebetween. Gap 416 may be configured to receive a portion of first separating member 200 when brought into close contact with second separating member 400, such as when actuated by pliers 500. First ramp flange 412 and second ramp flange 414 may comprise a first ramp 412*a* and a second ramp 414*a* disposed respectively thereon. First ramp flange 412, second ramp flange 414, first ramp 412*a*, and second ramp 414*a*, may, in embodiments, define a ramp portion configured to operatively engage gripping assembly 300. The ramp portion may further include thin sections 412*b* and 414*b*, as well as wide sections 412*c* and 414*c*. In some embodiments, the distance between thin section 412*b* and thin section 414*b* may be smaller than the distance between wide section 412*c* and wide section 414*c*. First ramp 412*a* and second ramp 414*a* are directed longitudinally outward from first separating member 200 when the demating device 100 is operational, such as when first separating member 200 and second separating member 400 are connected to pliers 500 (see FIGS. 6-7B). In some embodiments, first ramp 412*a* and second ramp 414*a* may define a partially curved shape which may aid in operative engagement of gripping assembly 300. First ramp 412*a* and second ramp 414*a* will be discussed in greater detail in relation to FIGS. 6-7B.

In some embodiments, distal portion 404 may include a connector receiving portion 420. Connector receiving portion 420 may include two flanges 422*a* and 422*b* having a recessed portion disposed therebetween. Connector receiving portion 420 may be configured to receive the socket portion of an electrical connector when engaging the connector. In some embodiments, connector receiving portion 420 may be configured to receive a portion of second connector 604 (see FIGS. 7A-7B). The size and shape of connector receiving portion 420 may be configured to receive different sized connectors. In some embodiments the distance between flanges 422*a* and 422*b* may be between about 0.2 inches to about 2.0 inches. In some embodiments, the distance between flanges 422*a* and 422*b* may be between about 0.6 inches to about 1.6 inches. In some embodiments, the distance between flanges 422*a* and 422*b* may be between about 0.7 inches to about 0.9 inches. In some embodiments, flanges 422*a* and 422*b* may extend at an angle gamma of between about 90 degrees to about 170 degrees. In some embodiments, flanges 422*a* and 422*b* may extend at an angle gamma of between about 100 degrees to about 150 degrees. In some embodiments, flanges 422*a* and 422*b* may extend at an angle gamma of between about 110 degrees to about 130 degrees. In some embodiments, the size and shape of connector receiving portion 420 may be similar to connector receiving portion 218 of the first separating member 200. In some embodiments, the size and shape of connector receiving portion 420 may be different than connector receiving portion 218 of the first separating member 200.

In some embodiments, flanges 422*a* and 422*b* may include protrusions 424*a* and 424*b*, respectively. Protrusions 424*a*, 424*b*, may be configured to insert into holes located on an electrical connector assembly when demating device 100 is engaging the electrical connector. Insertion of protrusions 424*a*, 424*b* into the electrical connector may, in some embodiments, convey stability of demating device 100 with the electrical connector assembly 600 so as to prevent rotation of the electrical connector while demating. In some embodiments, protrusions 424*a*, 424*b* may extend in a substantially parallel direction towards first separating member 200. In some embodiments, protrusions 424*a*, 424*b* may be cylindrical or rectangular-shaped. In some embodiments, protrusions 424*a*, 424*b* may extend longitudinally entirely through openings located on a second connector 604 of an electrical connector assembly 600, therein abutting a first connector 602 of the electrical connector assembly 600. In some embodiments, butting up of protrusions 424*a* and 424*b* against the first connector 602 of the electrical connector assembly 600 may allow for biasing of the second connector 604 away from the first connector 602, therein demating the electrical connector assembly 600 upon sufficient force. This will be discussed in greater detail below with relation to FIGS. 7A-7B.

Figure 6:
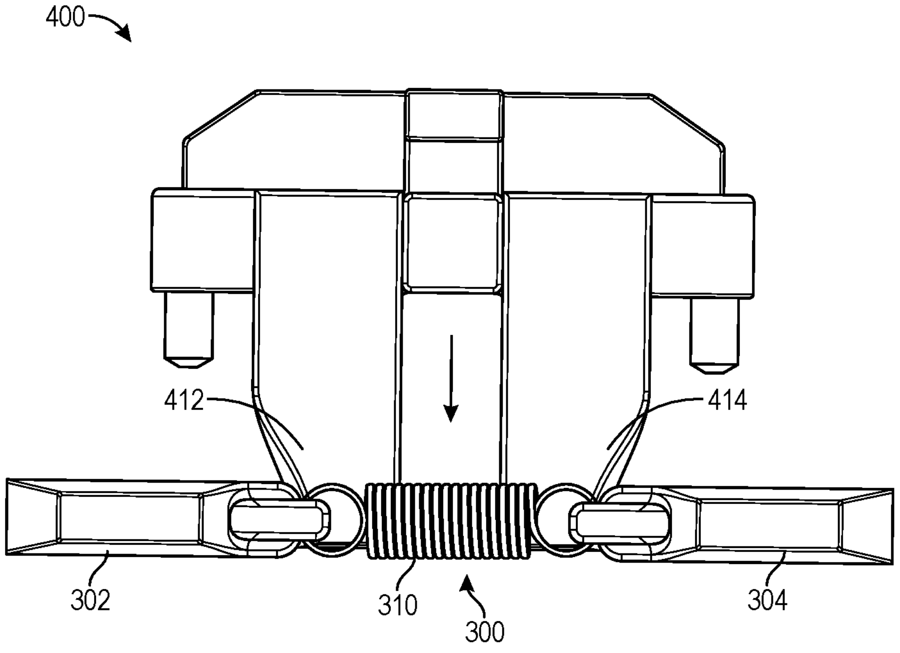
FIG. 6 depicts a top view of the second separating member and the gripping assembly, in some embodiments.
Figure 7A:
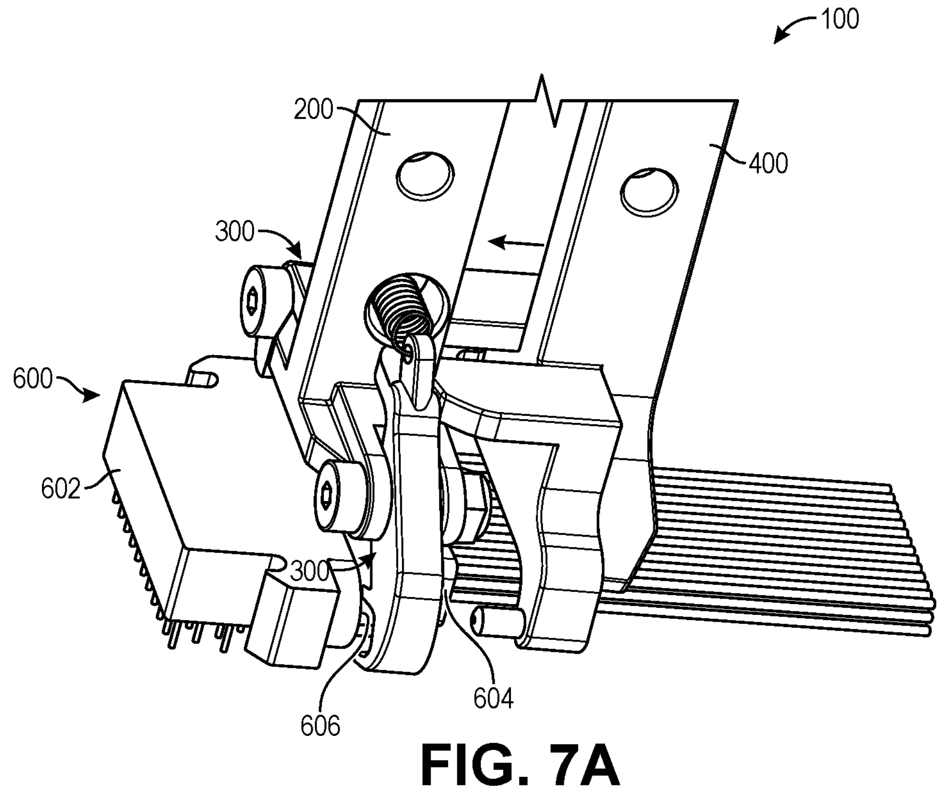
FIG. 7A depicts the demating device in an open configuration, in some embodiments.

FIG. 6 depicts a top view of the second separating member 400 and the gripping assembly 300 in the open configuration of demating device 100 (also see FIG. 7A). As illustrated, the first claw 302 and the second claw 304 rest on the thin sections 412*b* and 414*b* of the first ramp flange 412 and the second ramp flange 414, respectively. The elastic member 310 biases proximal ends 302*b* and 304*b* towards the ramp flanges 412, 414. Upon actuation of the second separating member 400 towards (see arrow) the gripping assembly 300, the proximal ends 302*b* and 304*b* will slide along first ramp 412*a* and second ramp 414*a* thereby stretching the elastic member 310 and being forced outwardly in the longitudinal direction. Such a motion will subsequently drive the distal ends 302*a*, 304*a* of the first claw 302 and the second claw 304 inwardly in the longitudinal direction. Such a motion allows demating device 100 to grasp onto an electrical connector via gripping assembly 300. This motion will be further discussed with reference to FIGS. 7A-7B below.

Figure 7B:
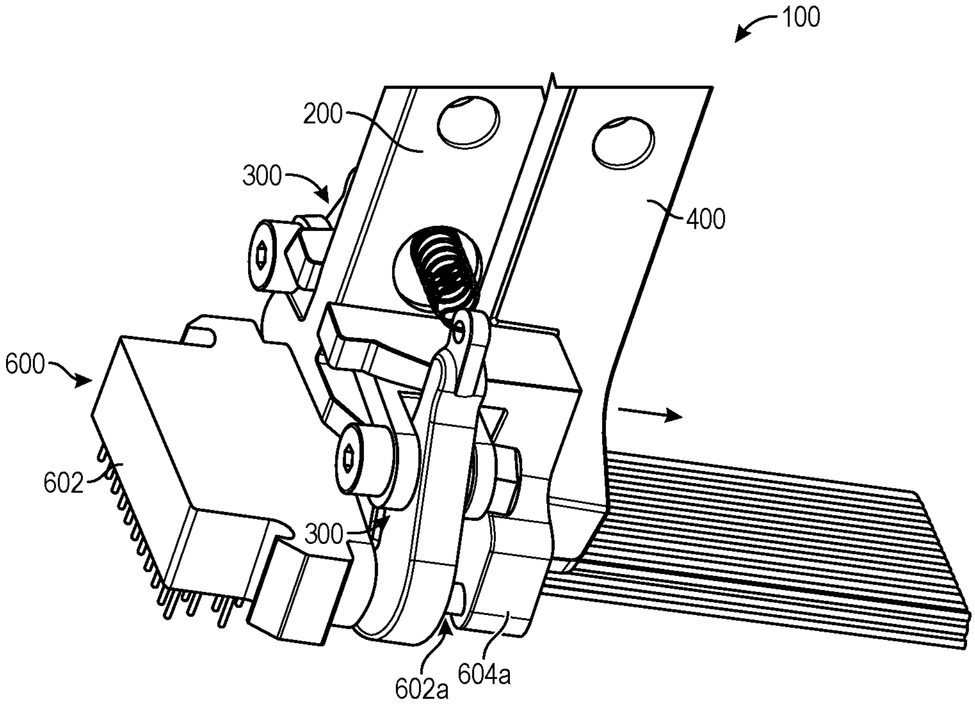
FIG. 7B depicts the demating device in a closed configuration, in some embodiments.

Referring now to FIGS. 7A and 7B, the demating device 100 is depicted in an open configuration (FIG. 7A) and a closed configuration (FIG. 7B) in relation to an electrical connector assembly 600, in some embodiments. In some embodiments, the electrical connector assembly 600 includes a first connector 602 and a second connector 604. In some embodiments, the first connector 602 includes at least one standoff 606. In some embodiments, standoffs 606 may include at least two standoffs, one disposed on each side, longitudinally, on first connector 602. In the open configuration, proximal ends 302*b* and 304*b* of the first claw 302 and the second claw 304 are biased inwards by elastic member 310. Subsequently, distal ends 302*a* and 304*a* of the first claw 302 and the second claw 304 are biased outwards due to rotation of the first claw 302 and the second claw 304 around the pivot points caused by nuts 324*a*, 324*b* and fasteners 322*a*, 322*b* securing the first claw 302 and the second claw 304 to the first separating member 200. In the open configuration, the gap between the first separating member 200 and the second separating member 400 may be sufficient to keep the proximal ends 302*b*, 304*b* abutting the thin sections 412*b* and 414*b* of the first ramp flange 412 and the second ramp flange 414.

Upon actuation of the second separating member 400 towards the first separating member 200 (direction of the arrow), such as with handles 508*a* and 508*b* of pliers 500, the demating device 100 moves from the open configuration depicted in FIG. 7A to the closed configuration depicted in FIG. 7B. During movement of the second separating member 400 towards the first separating member 200, the proximal ends 302*b* and 304*b* of the first claw 302 and the second claw 304 will slide along the first ramp 412*a* and second ramp 414*a* in a substantially parallel direction. In some embodiments, first ramp 412*a* and second ramp 414*a* get wider in the direction of the second separating member 400, approaching wide sections 412*c* and 414*c*. As such, proximal ends 302*b* and 304*b* will be forced away from one another in the longitudinal direction. In some embodiments, the force used to drive second separating member 400 towards first separating member 200 must be enough to overcome the force of elastic member 310 biasing proximal ends 302*b* and 304*b* towards one another.

In some embodiments, proximal ends 302*b* and 304*b* being forced away from one another causes rotation of first claw 302 and second claw 304 around rotational holes 312*a* and 312*b*, respectively. Rotation around rotational holes 312*a* and 312*b* may bias distal ends 302*a* and 304*a* towards one another. In some embodiments, this may cause grips 314*a* and 314*b* to receive a portion of electrical connector assembly 600, such as first connector 602. In some embodiments, this may cause grips 314*a* and 314*b* to receive standoffs 606 disposed on first connector 602. Gripping of first connector 602 by gripping assembly 300 may provide stability of the demating device 100 on electrical connector assembly 600, and more specifically on first connector 602. Such a stabilization may prevent twisting or rotating of a portion of electrical connector assembly 600 while demating.

In some embodiments, actuation of second separating member 400 towards first separating member 200 may cause insertion of protrusions 424*a* and 424*b* into holes on one end of electrical connector assembly 600, for example holes (not shown) in second connector 604. In some embodiments, actuation of second separating member 400 towards first separating member 200 may cause walls 426*a*, 426*b* of flanges 422*a* and 422*b* to mechanically engage one end of electrical connector assembly 600, for example side 602*a* of first connector 602 or side 604*a* of second connector 604. In some embodiments, second separating member 400 may lack protrusions 424*a* and 424*b*. This may be advantageous in some embodiments if second connector 604 lacks holes on the side adjacent to flanges 422*a* and 422*b*. In each of the aforementioned embodiments, pressure exerted from the distal portion 404 of second separating member 400 abutting against electrical connector assembly 600 may demate second connector 604 from first connector 602 in the substantially parallel direction (see arrow). For example, insertion of protrusions 424*a*, 424*b* through holes in second connector 604 may allow protrusions 424*a*, 424*b* to press against standoffs 606 on first connector 602. This pressure may cause second connector 604 to demate from first connector 602. Accordingly, stabilization via gripping assembly 300 and simultaneous demating by pressure from the second separating member 400 allows for demating of electrical connector assembly 600 without twisting or rotating the pins or receptors.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A demating system configured to separate a first connector and a second connector of an electrical connector assembly, the demating system comprising:

- a first separating member and a second separating member configured to operatively attach to a handle assembly,
- wherein the first separating member and the second separating member are configured to move laterally in a first direction upon actuation of the handle assembly,
- wherein the first direction is substantially parallel to a longitudinal axis of the electrical connector assembly;
- a set of claws operatively connected to a distal end of the first separating member at a plurality of pivot joints, the set of claws configured to move radially in a second direction;
- an elastic member operatively connected to proximal ends of the set of claws,
- wherein the elastic member biases the proximal ends of the set of claws towards one another around the plurality of pivot joints;
- a ramp portion disposed at a distal portion of the second separating member configured to engage the proximal ends of the set of claws to move the set of claws towards a closed position; and
- a gap disposed on the distal portion of the second separating member,
- wherein the gap receives a portion of the first separating member when in a closed configuration.

2. The demating system of claim 1, wherein the set of claws comprise at least one grip for receiving the first connector.

3. The demating system of claim 1, wherein the second separating member comprises at least one protrusion disposed on the distal portion, the at least one protrusion configured to separate the electrical connector assembly.

4. The demating system of claim 1, wherein the first separating member comprises a first connector receiving portion, and the second separating member comprises a second connector receiving portion;

- wherein the first connector receiving portion and the second connector receiving portion are each a selected size to fit the first connector and the second connector.

5. The demating system of claim 1, wherein the distal end of the first separating member comprises an opening receiving the elastic member therethrough.

6. The demating system of claim 1, wherein the second direction is substantially perpendicular to the longitudinal axis of the electrical connector assembly.

7. The demating system of claim 1, wherein the elastic member comprises a spring or a rubber.

8. The demating system of claim 1, wherein the set of claws form a first gripping assembly, and wherein the demating system further comprises:

- a second gripping assembly having a difference size than the first gripping assembly,
- wherein the first separating member is configured to couple to both the first gripping assembly and the second gripping assembly.

9. The demating system of claim 1, wherein the handle assembly comprises a first handle and a second handle.

* * * * *